June 3, 1952 — C. F. GRAFF — 2,598,995
FOOD CARRIER ASSEMBLY
Filed Feb. 14, 1949 — 2 SHEETS—SHEET 1

Inventor:
Christian F. Graff
by his Attorneys
Howson & Howson

June 3, 1952  C. F. GRAFF  2,598,995
FOOD CARRIER ASSEMBLY
Filed Feb. 14, 1949  2 SHEETS—SHEET 2
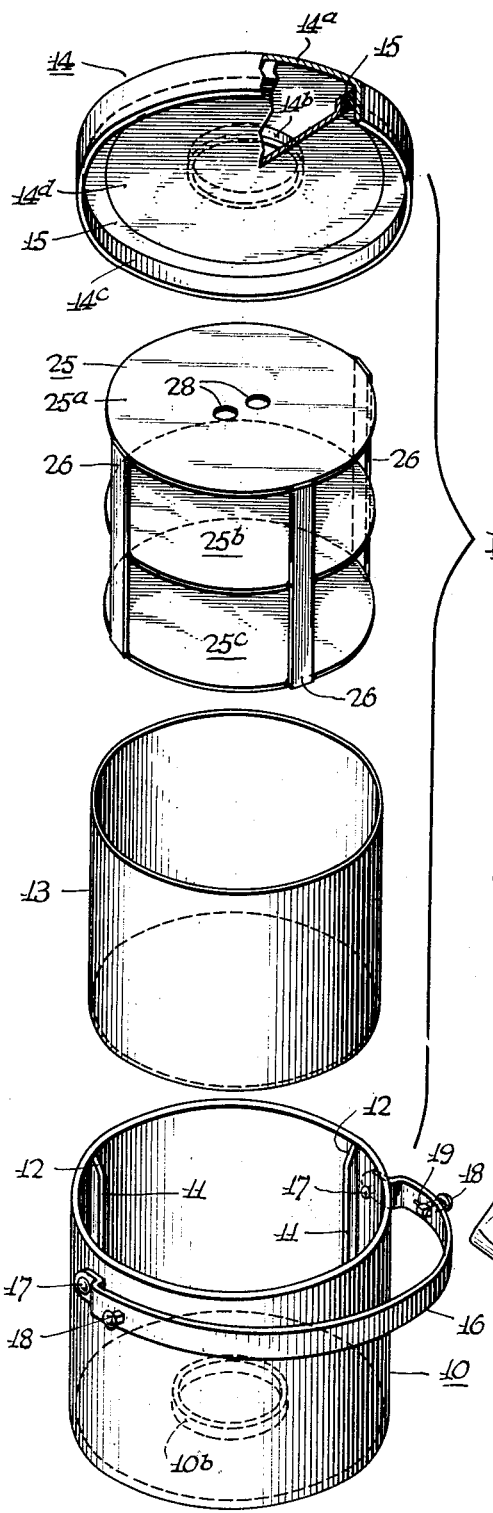
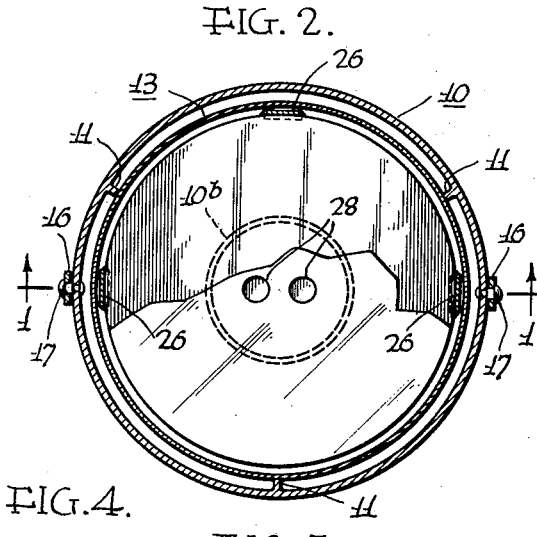
FIG. 2.
FIG. 4.
FIG. 5.
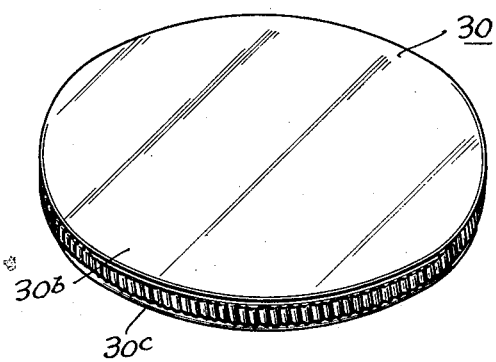
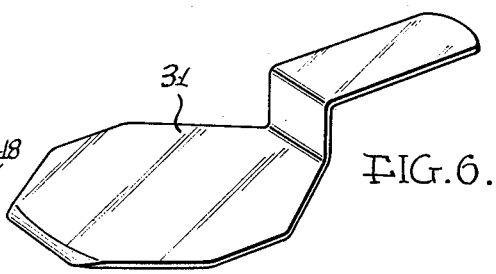
FIG. 6.
Inventor:
Christian F. Graff
by his Attorneys
Howson & Howson Patented June 3, 1952

2,598,995

UNITED STATES PATENT OFFICE 2,598,995

FOOD CARRIER ASSEMBLY

Christian F. Graff, Mechanicsburg, Pa.

Application February 14, 1949, Serial No. 76,303

5 Claims. (Cl. 126—375)

This invention relates to food containers and more particularly to an insulated pail adapted to carry one or more conventional dinner plates.

I have found that under certain conditions it is highly desirable to be able to store and transport several meals in an insulated container in which food may be kept warm for extended periods of time. Such a carrier has many applications where meals are prepared in a restaurant or kitchen and are to be taken out for eating at a different place and at a later time. Workers' lunches or dinners, as well as meals for semi-invalids and travelers are instances of such uses. The invention is also intended for motorists, air travelers, hospital patients, and patrons of large institutional cafeterias or restaurants in which there may be a substantial lapse of time between the actual serving of the food on the plate and the time when the patron can find a seat and begin to eat. The heavy electrically heated food carriers of the prior art, as well as carriers not adapted to accommodate dinner plates, have been found to be too expensive, too heavy, and entirely impractical for the many purposes outlined above.

My carrier may be constructed of a lightweight metal such as aluminum, or it may be made of a strong synthetic plastic material. In the metallic form, suitable thermal insulation is achieved by means of inner and outer walls forming an air space which is sealed by means of a gasket in the lid. Where a relatively non-conducting material such as plastic is used, it may be found undesirable to employ a double wall construction.

A primary object therefore of the invention, is to provide an insulated plate carrier assembly which is inexpensive to manufacture and which is adapted to accommodate a plurality of conventional dinner plates.

A further object of the invention is to provide in a food carrier of the type described, a removable rack adapted to support a plurality of conventional dinner plates.

A further object of the invention is to provide in a food carrier of the class described, an insulated lid and handle construction adapted to assist in insulating the carrier and to enable stacking of the carriers.

A further object of the invention is to provide an improved heat-retaining element for use with carriers of the class described.

Further objects will be apparent from the specification and drawings in which:

Fig. 2 is a transverse section, on a reduced scale, of the structure of Fig. 1 as seen at 2—2;

Fig. 4 is an exploded view of the carrier assembly;

Fig. 5 is a perspective of the warming element; and

Fig. 6 is a perspective of a lifter for the warming element.

Figure 1:
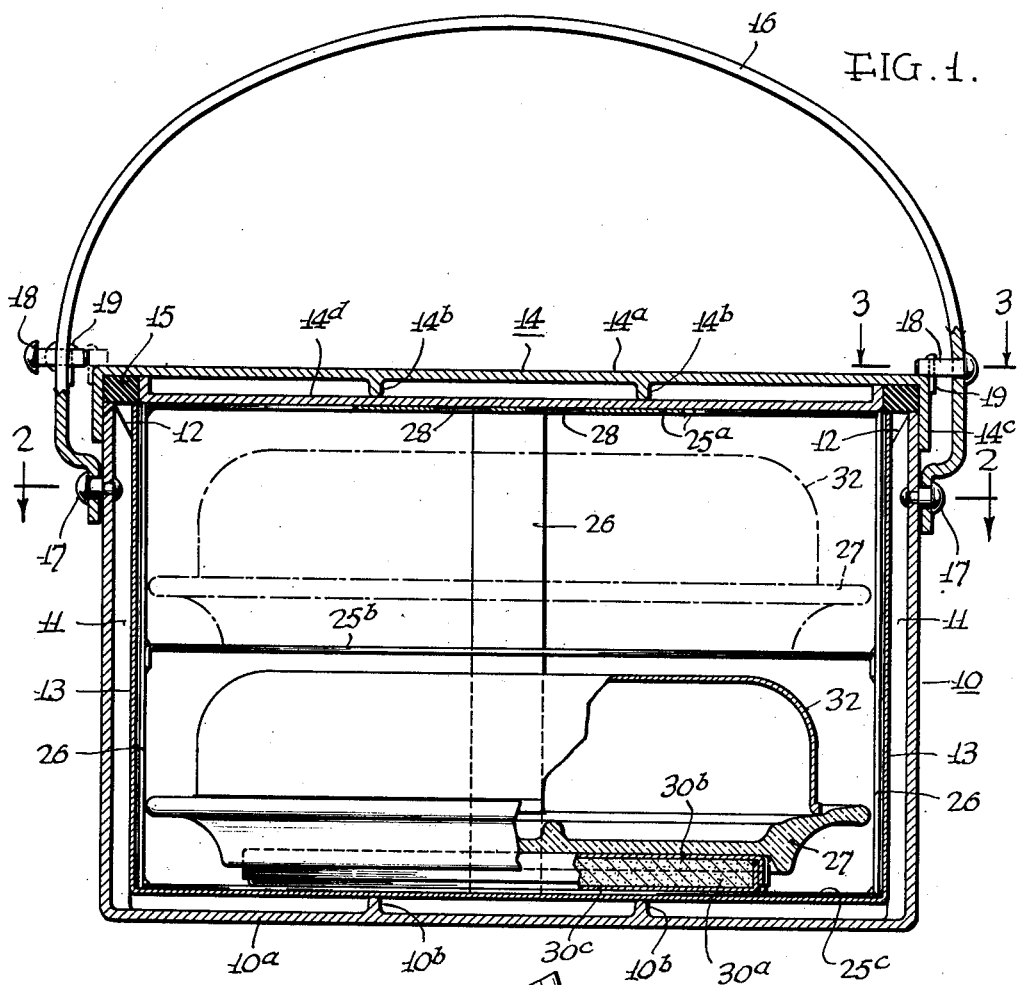
Fig. 1 is a vertical section of a food carrier constructed in accordance with the invention, as seen at 1—1 of Fig. 2.
Figure 3:
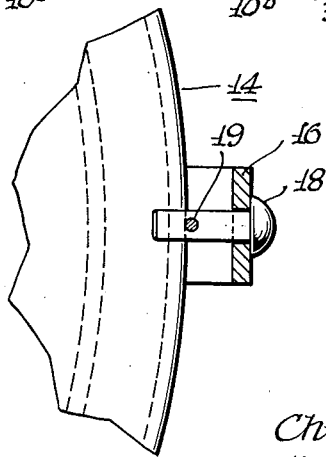
Fig. 3 is an enlarged fragmentary detail, as seen at 3—3 of Fig. 1.

The invention comprises essentially the provision of a double walled cylindrical pail having a pivoted handle and an overhanging flat lid. The lid is provided with an inner and outer wall for suitable insulation, as well as a gasket which seals the air space between the inner and outer walls of the pail proper. Slidable pins on the handle are adapted to retain the lid in place, and the handle may pivot in such a manner that the carriers may be conveniently stacked on top of each other.

In the preferred form, a three tiered tray fits snugly inside the pail and the diameter of the tray is sufficient to accommodate the standard 10" plate. The vertical spacing between the shelves or tiers of the tray is sufficient to permit the use of the conventional metallic "banquet cover." The tray is formed of three upright posts which may be welded to the individual tiers; and the top of the tray is flat so that it may be utilized as a table or stand for the plates when eating. In order to avoid the use of a handle at the top of the tray, the uppermost shelf is provided with a pair of finger holes so that the tray may be easily inserted and removed from the carrier.

When it is intended to retain food for extended periods of time in the pail, I have found it desirable to use a heat-retaining member under one or more of the plates. Such a heat-retaining member or warmer is preferably of a diameter suitable to fit within the under rim of the plate and is constructed of soapstone encased in a metal, such as stainless steel.

Referring more particularly to the drawings, the preferred form of the food carrier comprises the pail proper 10 which has a bottom 10a having an annular ring 10b formed integrally therewith. A plurality of vertical spacing ribs 11 are provided around the inner periphery of pail 10 and these ribs may be beveled at 12 to facilitate the insertion or the removal of the liner 13 which has a close sliding fit with ribs 11 and abuts ring 10b. The top of liner 13 is in horizontal registry with the top of the pail 10 so that the space between the liner and the pail may be effectively sealed to provide suitable thermal insulation.

The lid assembly 14 comprises the lid proper 14a which has an annular ring 14b and a downwardly depending flange or collar 14c. The inner wall 14d of the lid is fitted in spaced relation to the lid proper 14a and is retained therein by means of a suitable rubber annular gasket 15. It will be noted that the width of gasket 15 is sufficient to completely seal the space between the liner 13 and the outer pail 10. A handle or bail 16 is pivotally secured to pail 10 by means of shoulder rivets 17, 17 and the bail 16 is provided with a pair of square-shank pins 18, 18 which may be moved transversely in the bail and retained therein by means of keys 19, 19. When lid 14 is in position and bail 16 is substantially vertical, pins 18 may be pushed inwardly to retain lid 14 securely in place and to provide an effective seal between gasket 15 and the upper edges of the pail assembly. When pins 18 are pushed radially outward, the bail 16 may be pivoted and the lid removed.

The tray assembly 25 in the preferred form comprises three circular shelves 25a, 25b and 25c which are attached axially to each other by means of posts 26, 26, two of said members 26 being positioned diametrically opposite to each other and the third being at substantially 90° to the others. This construction permits the dinner plates 27 to be readily inserted on either of the bottom shelves 25b or 25c. The top shelf 25a is provided with a pair of finger holes 28, 28 so that the tray assembly 25 may be conveniently inserted and removed from the liner 13.

All parts of the carrier heretofore described are inexpensive to manufacture, have a minimum of sharp corners or recesses, and therefore may be readily cleaned. Also, the liner 13 may be easily removed for cleaning as well as for wiping out condensate. The flat top of tray 25 enables it to be used as a table when eating and it also cooperates with the inner wall 14d of the lid to assist in retaining heat inside the carrier.

The details of construction described heretofore provide ample insulation and heat-retention for ordinary periods of time up to one or two hours. Should it be desired to retain the dinner plates and food warm for a longer period, I provide a soapstone warmer 30 which is constructed of a cylindrical piece of soapstone 30a (Fig. 1) encased in sheet metal covers 30b and 30c preferably made of stainless steel. The warmer 30 is heated in an oven or on the stove and then may be positioned on either shelf 25b or 25c by means of the lifter 31 (Fig. 6). The vertical spacing between the shelves is just sufficient to permit the use of a conventional banquet cover 32 as well as the warmer 30.

It will thus be apparent that I have provided a convenient food carrier which is capable of retaining plates of food warm for substantial periods of time and which is simple to operate and inexpensive to manufacture. When used by workers, the carrier will take the place of the conventional lunch box in which only cold solid food may be carried.

Having thus described my invention, I claim:

1. A food carrier assembly comprising an outer cylindrical pail, a bail pivotally attached to said pail, a plurality of vertical ribs radially secured around the inner periphery of said pail, a cylindrical liner adapted to slide into the pail in contact with said ribs, spacing means on the bottom of the pail to provide air space between the bottom of the liner and the pail, a lid for the pail, said lid having an upper and a lower surface in spaced relation to provide thermal insulation therebetween, an annular gasket around the periphery of said lid, said gasket being of sufficient width to seal both the pail and the liner, and means in the bail for retaining said lid and gasket in sealed relation with the pail and liner.

2. A food carrier assembly comprising an outer cylindrical pail, a bail pivotally attached to said pail, a plurality of vertical ribs radially secured around the inner periphery of said pail, a cylindrical liner adapted to slide into the pail in contact with said ribs, spacing means on the bottom of the pail to provide air space between the bottom of the liner and the pail, a lid for the pail, said lid having an upper and a lower surface in spaced relation to provide thermal insulation therebetween, an annular gasket around the periphery of said lid, said gasket being of sufficient width to seal both the pail and the liner, means in the bail for retaining said lid and gasket in sealed relation with the pail and liner, and a tray having a plurality of shelves adapted to fit snugly in said liner and abut the under surface of the lid when in sealing position.

3. A food carrier assembly comprising an outer cylindrical pail, a bail pivotally attached to said pail, a plurality of vertical ribs radially secured around the inner periphery of said pail, a cylindrical liner adapted to slide into the pail in contact with said ribs, spacing means on the bottom of the pail to provide air space between the bottom of the liner and the pail, a lid for the pail, said lid having an upper and a lower surface in spaced relation to provide thermal insulation therebetween, an annular gasket around the periphery of said lid, said gasket being of sufficient width to seal both the pail and the liner, means in the bail for retaining said lid and gasket in sealed relation with the pail and liner, a tray having a plurality of shelves adapted to fit snugly in said liner and abut the under surface of the lid when in sealing position, and a warming member adapted to be positioned on one of the tray shelves.

4. A food carrier assembly comprising a carrier body, a bail pivotally attached to said body, a lid for said body, sealing means between said lid and said body, a pair of horizontally slidable pins on said bail adapted to engage the top of the lid for retaining said lid in sealing connection with the body when the bail is raised, and a removable tray for the body comprising a plurality of shelves ragidly attached to each other in vertical spaced relation.

5. A food carrier assembly comprising a carrier body, a cylindrical liner supported within said body in spaced relation with respect thereto, a bail pivotally attached to said body, a lid for said body, sealing means between said lid and body, a pair of horizontally slidable pins on said bail adapted to engage the upper surface of said lid for retaining the lid in sealed engagement with said body when said bail is raised, and a removable tray for said body comprising a plurality of shelves rigidly attached to each other in vertically spaced relation and fitting snugly within said cylindrical liner.

CHRISTIAN F. GRAFF.

REFERENCES CITED

The following references are of record in the file of this patent:

UNITED STATES PATENTS

| Number | Name | Date |
|---|---|---|
| 170,770 | Roberts | Dec. 7, 1875 |
| 369,112 | Jory | Aug. 30, 1887 |
| 848,889 | Fitzgerald | Apr. 2, 1907 |
| 909,238 | Seely | Jan. 12, 1909 |
| 1,056,595 | Sheer | Mar. 18, 1913 |
| 1,065,663 | Stone | June 24, 1913 |
| 1,362,933 | Ferdon | Dec. 21, 1920 |
| 1,556,384 | Vehling et al. | Oct. 6, 1925 |
| 1,775,504 | Young | Sept. 9, 1930 |
| 1,827,221 | Burrows | Oct. 13, 1931 |
| 2,147,886 | Devine | Feb. 21, 1939 |
| 2,359,335 | Stuart et al. | Oct. 3, 1944 |

FOREIGN PATENTS

| Number | Country | Date |
|---|---|---|
| 198,660 | Germany | May 30, 1908 |